United States Patent
Müntener

[11] Patent Number: 6,129,008
[45] Date of Patent: Oct. 10, 2000

[54] APPARATUS FOR MIXING AND REFINING A CHOCOLATE MASS

[75] Inventor: Kurt Müntener, Bad Salzuflen, Germany

[73] Assignee: Richard Frisse GmbH, Bad Salzuflen, Germany

[21] Appl. No.: 09/476,340

[22] Filed: Jan. 3, 2000

Related U.S. Application Data

[60] Continuation-in-part of application No. 09/300,275, Apr. 27, 1999, Pat. No. 6,047,631, which is a division of application No. 08/921,148, Aug. 29, 1997, Pat. No. 5,911,811.

[30] Foreign Application Priority Data

Sep. 12, 1996 [DE] Germany .......................... 196 37 098

[51] Int. Cl.⁷ .............. A23G 1/00; A23G 1/06; A23G 1/10; A23G 1/16
[52] U.S. Cl. ................ 99/348; 99/483; 99/485; 366/147; 366/149; 366/302; 366/307
[58] Field of Search .......................... 99/348, 485, 486, 99/472, 493, 452–462; 366/83–86, 146–149, 144, 142, 302–307, 297–301; 426/231, 519, 660

[56] References Cited

U.S. PATENT DOCUMENTS

| | | | |
|---|---|---|---|
| 3,628,965 | 12/1971 | Nijkerk | 99/479 X |
| 3,634,106 | 1/1972 | Organ et al. | 99/485 |
| 3,663,231 | 5/1972 | Tourell | 99/485 |
| 3,955,489 | 5/1976 | Goerling et al. | 99/485 |
| 4,679,498 | 7/1987 | Chaveron et al. | 366/75 |
| 4,878,426 | 11/1989 | Tadema | 99/485 |
| 5,156,867 | 10/1992 | Leuthold et al. | 426/231 |
| 5,156,868 | 10/1992 | Muntener . | |
| 5,200,220 | 4/1993 | Capodieci | 99/348 X |
| 5,320,427 | 6/1994 | Callebaut et al. | 366/309 X |
| 5,332,588 | 7/1994 | Capodieci | 366/601 X |
| 5,351,609 | 10/1994 | Muntener | 99/485 |
| 5,353,696 | 10/1994 | Stadelmann et al. | 99/472 |
| 5,419,635 | 5/1995 | Schulte et al. . | |
| 5,450,786 | 9/1995 | Muntener | 99/485 |
| 5,810,476 | 9/1998 | Muntener . | |
| 5,814,362 | 9/1998 | Muntener . | |
| 5,823,673 | 6/1999 | Muntener . | |
| 5,911,811 | 6/1999 | Muntener . | |

FOREIGN PATENT DOCUMENTS

19636989  4/1987  Germany .

*Primary Examiner*—Timothy Simone
*Attorney, Agent, or Firm*—Burns, Doane, Swecker & Mathis, LLP

[57] ABSTRACT

The present invention is directed to making the mixing and refining of chocolate masses more cost effective by increasing the flow of energy through the material to be treated.

9 Claims, 10 Drawing Sheets

APPARATUS FOR MIXING AND REFINING A CHOCOLATE MASS

REFERENCE TO RELATED APPLICATIONS

The present application is a continuation-in-part of U.S. application Ser. No. 09/300,275 filed Apr. 27, 1999, now U.S. Pat. No. 6,047,631, entitled For Mixing And Refining A Chocolate Mass, which in turn is a divisional of U.S. application Ser. No. 08/921,148 filed Aug. 29, 1997, now U.S. Pat. No. 5,911,816 entitled Apparatus For Mixing And Refining A Chocolate Mass, the contents of which are hereby incorporated by reference in their entireties.

FIELD AND BACKGROUND OF THE INVENTION

In general, conching machines are used for mixing and refining a chocolate mass. Such conching machines comprise typically shearing tools extending mainly in radial direction from a rotor arranged in a partially cylindrical trough. These shearing tools have a surface inclined to the trough wall and end often in a relative sharp edge. In this way, they may act in a double manner, i.e. either by shearing chocolate mass off the trough walls when running in one direction, or by providing a rheological shearing effect onto individual layers of the chocolate mass when running in the other direction where the mass is caught in the gap between the trough walls and the converging surface of the shearing tools.

The expenditure for manufacturing such conching machines is considerable, and so are they in operation. For the individual chocolate mass remains in such a conching machine for a long period while mechanical energy is introduced into the mass to bring it from a more or less dry condition to a pasty condition and to make it eventually liquid.

Therefore, attempts have been made to shorten the conching time and/or to replace conching by other processes, or, at least, to simplify the conching process. An increase of introduced energy to shorten the process is, however, not possible to an unlimited extent, because any mechanical energy introduced into the mass converts itself into heat energy, thus heating up the mass. In doing this, there are certain limits not to be exceeded. Heretofore, conching machines were surrounded by an outer tempering or cooling jacket (at the beginning of operation, a conching machine has often to be first to be heated by means of this jacket to soften the chocolate mass. Thus, "tempering" means both heating and cooling)). This jacket provided for heat dissipation during operation, but had, of course, also some limits.

SUMMARY OF THE INVENTION

Therefore, it is an object of the present invention to make mixing and refining of chocolate masses more cost effective by increasing the flow of energy through the material to be treated.

In a first aspect of the invention, this object is achieved by an apparatus for mixing or refining a chocolate mass which comprises a conching vessel, the walls of which are cylindrical at least in part, the vessel further comprising a radial outer jacket for a tempering fluid, wherein heat dissipation is increased by at least one second tempering arrangement.

By providing at least one second tempering arrangement, apart from the radial outer tempering arrangement, i.e. the jacket, heat dissipation is increased, thus enabling a higher energy input per time unit into the chocolate mass.

It should not be concealed that providing at least one second tempering arrangement may also involve new problems, especially how to accomplish it and where. This can be solved by an apparatus where the second tempering means comprise a second jacket, i.e. different from the radial outer jacket. Particularly preferred is an apparatus that comprises at least one additional shearing tool for sweeping and shearing over said second jacket. The reason is that cooling a wall results in forming a layer of more or less solidified chocolate mass on this wall, and this layer acts as an isolating material, thus preventing an effective heat dissipation. Heretofore, the tempering circumstances were far simpler in that the shearing tools swept and scratched over the inner wall of the jacket, thus preventing any formation of any chocolate layer.

Another beneficial embodiment provides an apparatus moving either the vessel or trough, and/or a coaxial part as a rotor wherein the second tempering arrangement is provided on this rotor. In this case it is particularly useful to provide a scraping or shearing tool that cooperates with the tempered rotor wall.

Another embodiment provides second tempering means including air supply means that open into the vessel or trough for introducing tempering air into the chocolate mass. Such type of tempering by air has the additional advantage of an intimate contact of the chocolate mass with an oxygen carrier, and of an improved discharge of undesirable smells and taste substances which might be still present from the initial cocoa beans.

According to another aspect of the invention, it should be considered that the higher the input of energy is, the more will chocolate mass splash out of the vessel or trough. To prevent this an apparatus for mixing or refining a chocolate mass comprises a conching vessel having a top portion. A channel is extends on top of the vessel opening into it and is exposed to air. A cleaning device is movable into the channel in the direction of its longitudinal axis between an inoperative position and an advanced position. Advantageously, this channel may be used to supply the chocolate mass to be treated to the vessel and/or to supply or discharge the tempering air mentioned above.

Now, it has been found that an improved input of energy into the chocolate mass is enabled by an apparatus wherein the wall means of the vessel are swept by shearing tools, and mixing tools are also provided. In this case, the shearing and mixing tool means are in close vicinity to each other to guide said chocolate mass from one of said tool means to the other one, thus achieving a more intense treatment. For in this way, a synergetic cooperation of the different types of tools is achieved, the mixing tools acting as guide elements for directing chocolate mass to the shearing tools. In such an embodiment an enhanced stability and strength of the rotor is ensured if the inner rotor that rotates relative to the walls of the vessel, carries both types of tools and the mixing tools extend helically along a periphery of the rotor and the shearing tools. For the rotor will be exposed to higher stress due to the increased input of energy. As an alternative or in addition the shearing tools may be sub-divided into individual sections over the length of the vessel, wherein at least part of said sections have lateral surfaces arranged transversely with respect to the longitudinal axis of the vessel to achieve a mixing effect.

It has been found that a more intense treatment can be achieved by an apparatus which comprises different configurations of shearing tools, i.e. first shearing tools which have a shearing edge having a first configurational relationship as to distance, inclination or direction of their shearing edge with respect to said wall means, and second shearing tools having a different configurational relationship thereto. Both types of shearing tools sweep over the walls of the vessel.

According to another aspect of the invention, the intensity of treatment could be adjusted by an apparatus wherein the shearing tools are substantially ledge-shaped so as to face said wall means with one surface under an angle leaving a gap in-between, while extending substantially in longitudinal direction of the vessel. In, such an arrangement, an adjusting device for the angle and/or the distance or gap may be provided.

While in the prior art, the treatment of the chocolate mass was substantially effected by treating tools which extended in radial direction with respect to the longitudinal axis of the vessel or trough, additional energy may be worked into the chocolate mass by the body of the rotor itself. In this case, the vessel and/or the inner coaxial part may have at least one kneading surface.

Another embodiment for intensifying the treatment provides at least two drives for imparting a relative motion between the vessel and the inner coaxial part when operative. Shearing tools are provided on each, the vessel and the inner part and cooperate with each other to exert a rheological shearing force onto the chocolate mass.

BRIEF DESCRIPTION OF THE DRAWINGS

Further details of the invention will become apparent from the following description of embodiments schematically shown in the drawings, in which:

FIG. 5 is an alternative embodiment of which

FIG. 9 represents further embodiment in a view similar to that of FIG. 6, while

DETAILED DESCRIPTION OF THE DRAWINGS

Figure 1:
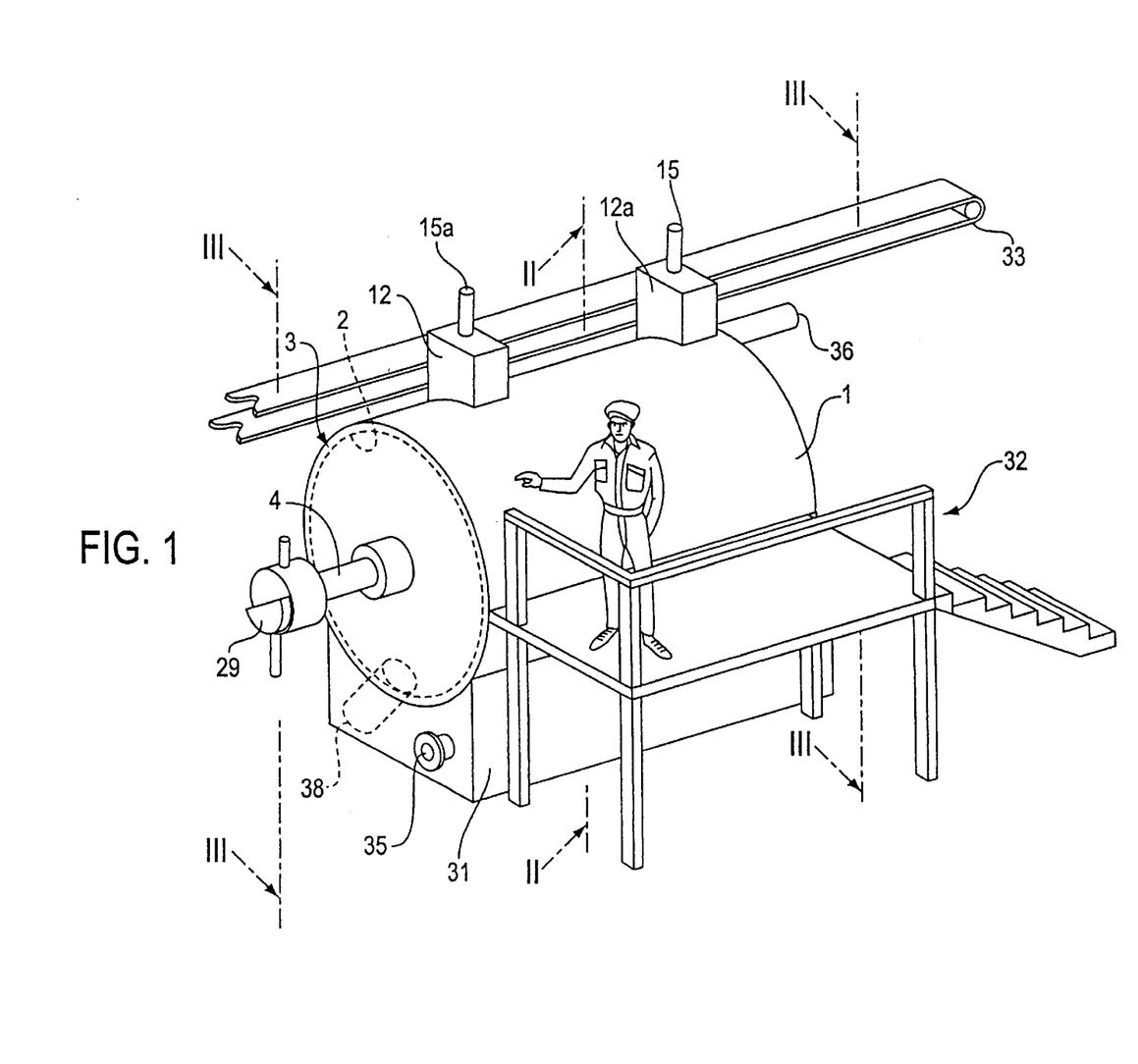
FIG. 1 is a perspective view of an apparatus according to the invention.

According to FIG. 1, a cylindrical vessel 1 sits on a base 31. The whole vessel may be accommodated within a housing 37 (FIG. 2) of rectangular cross-section. A frame 32 situated beside the vessel 1 enables an access to the top portions of the apparatus. Below the frame 32, a drive motor 39 as well as installation pipes can be accommodated, as may be seen from FIG. 2.

Figure 2:
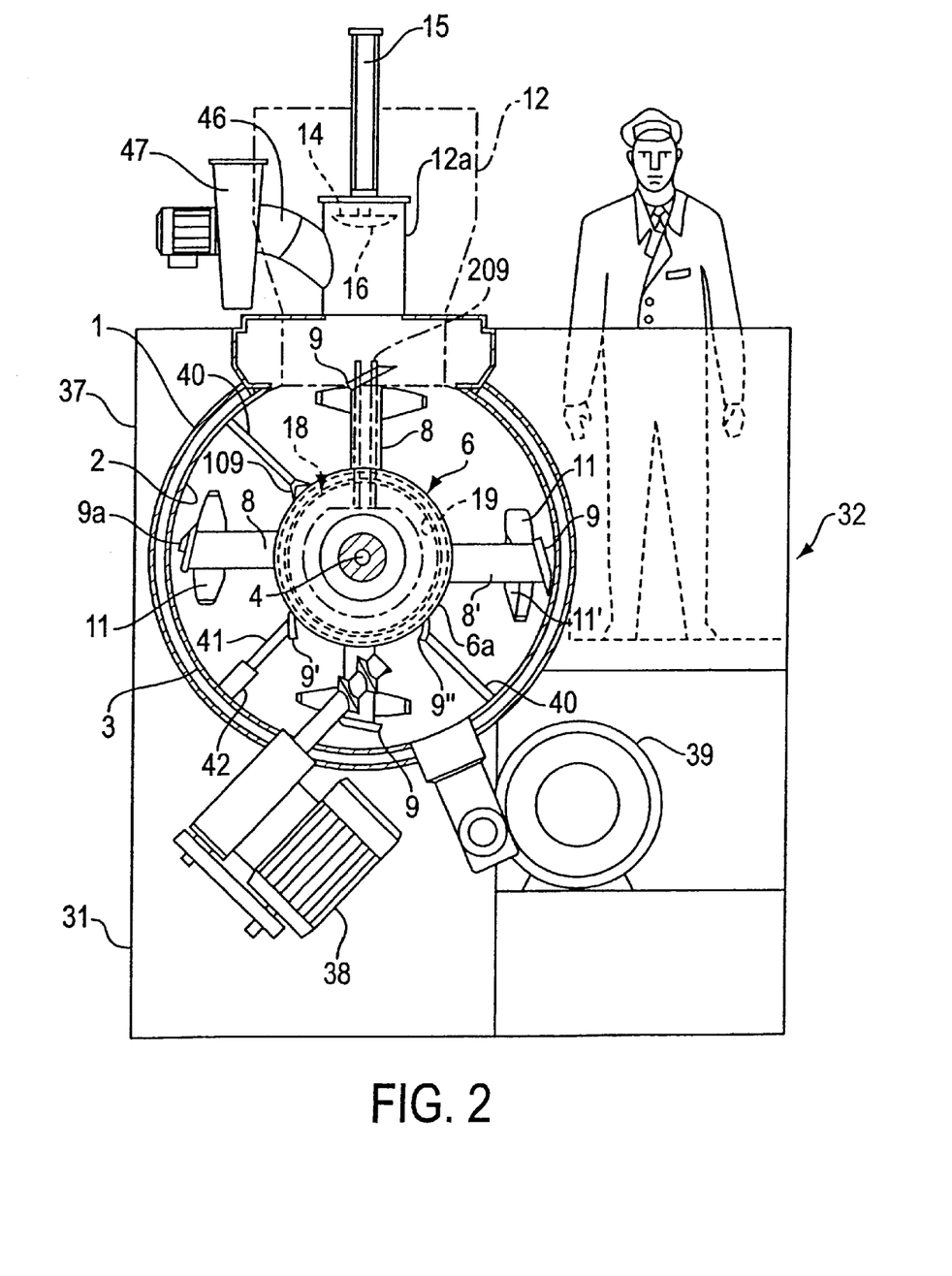
FIG. 2 is a cross-section along the line II—II of FIG. 1.
Figure 3:
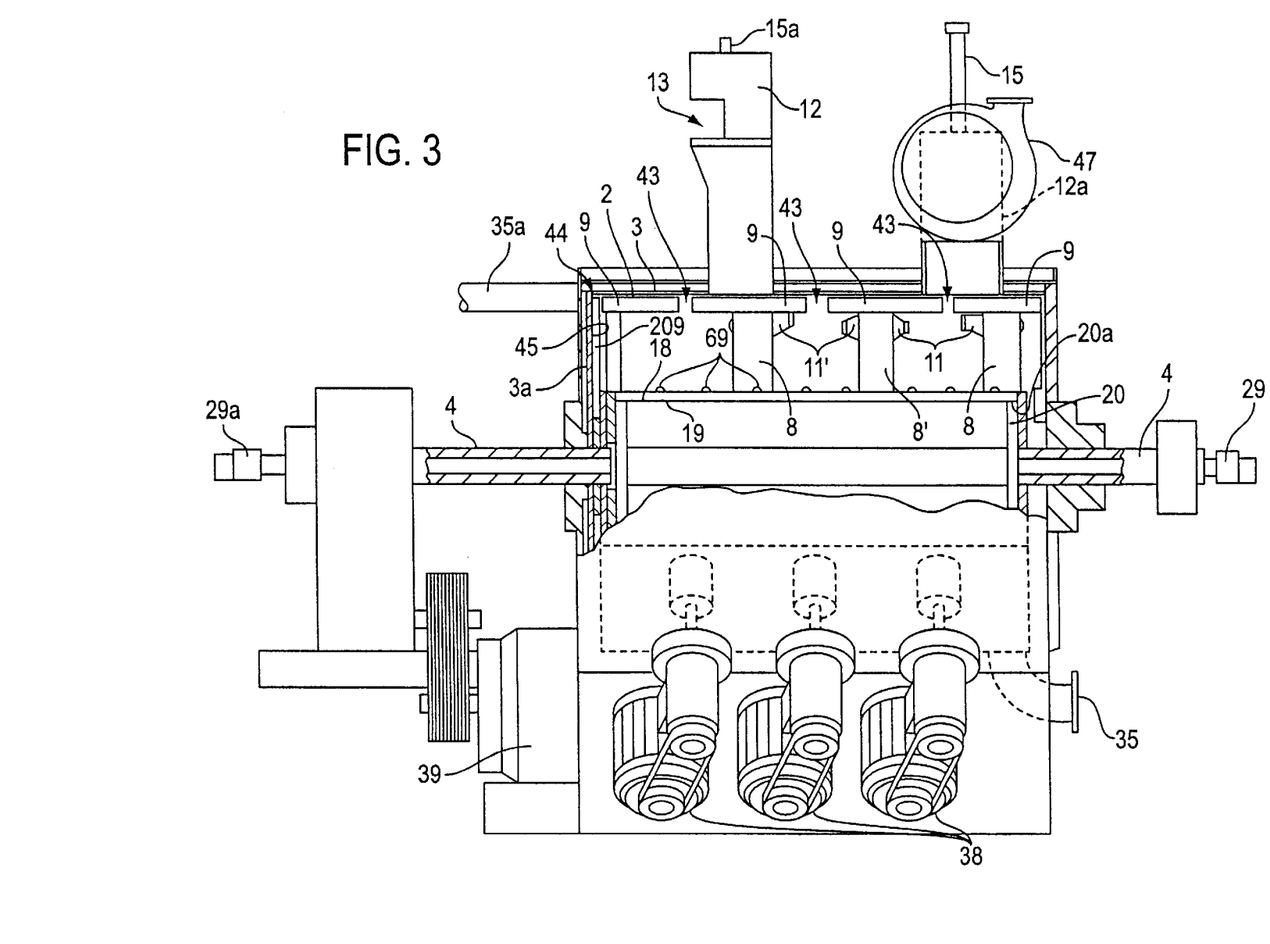
FIG. 3 is a cross-section in the plane III—III of FIG. 1.

The vessel 1 has a filling shaft 12 through which chocolate mass may be filled in through a lateral opening 13 not visible in FIG. 1, but shown in FIG. 3. There is a belt conveyor 33 from which the mass can be filled into the opening 13 by means of a stripper or wiper not visible in this view, but known per se. Another shaft 12a may be provided at the other end of the vessel 1 for aerating or venting purposes. The details of the shafts will be described later with reference to FIG. 2; here, it should only be mentioned that the shafts 12, 12a can be closed by fluidically driven sliders, one cylinder unit 36 being visible in FIG. 1.

Moreover, a rotatory or swing joint 29 is provided for introducing a tempering fluid, i.e. either a cooling or a heating fluid according to the requirements, at one end of a hollow shaft 4 driven by a motor 39 (FIG. 2) at its other end. This shaft 4 drives a rotor provided with tools in the interior of the conching vessel 1. Apart from this rotor, at least one shearing and/or conveying device driven by a motor 38 (indicated by broken lines in FIG. 1) and extending at least approximately in radial direction with respect to the longitudinal axis of the vessel 1 serves to treat the mass introduced into the vessel 1, as has become known from U.S. Pat. No. 5,419,635. The vessel 1 has an inner peripheral jacket wall 2 indicated in broken lines to form a tempering space 3. This space 3 has a pipe connection 35, e.g. an outflow, at one side of the base 31. A supply tube 35a is indicated in FIG. 3.

FIG. 2 illustrates, above all, the inner construction of the rotor within the vessel 1 as well as the special structure of the shaft 12a that comprises a cleaning device. A similar cleaning device, as will be discussed with reference to shaft 12a may optionally also be provided for the shaft 12 indicated by broken lines in FIG. 2.

As shown in FIG. 2, the hollow shaft 4 is connected to a rotor body 6. As indicated by broken lines, the rotor body 6 has an inner core 19 surrounded by an outer jacket 6a. Between the core 19 and the outer jacket 6a, an annular space 18 is provided for supplying a tempering medium, generally a cooling medium. The supply is effected through the rotary joint 29 (FIG. 1) and the hollow shaft in communication therewith, the hollow space of the shaft communicating with this annular space or tempering channel 18.

FIG. 3 illustrates how the hollow shaft 4 communicates with the tempering channel 18 via at least one radial channel 20 (or via a spacing that extends in radial direction) and through an opening 20a. The tempering medium may be air discharged into the chocolate mass in the interior of the vessel 1 through nozzle orifices 69 merely schematically indicated in FIG. 3. A similar arrangement has been suggested in German Patent Application No. 195 44 415.9. With respect to the construction of the nozzles 69 in detail, reference is made to the aforesaid German Patent Application, the contents of which being incorporated here by reference. In this way, a double effect is achieved, namely more intense tempering in addition to the known tempering space 3 and the inner wall 2 of the vessel 1, on the one hand. This inner wall 2 is swept by ledge-shaped shearing or scrapping tools 9. However, cooling (or heating) the chocolate mass by air blown into the vessel is more effective, since the tempering fluid contacts the chocolate mass directly rather than via a wall, as in the case of wall 2. On the other hand, aerating of the chocolate mass, which is, in general, strived for, is enhanced in an exceedingly favorable manner, thus improving its taste and flavor.

It is clear that water may also be introduced through a rotary joint, such as the joint 29, instead of using nozzles 69 and supplying air as a heating and/or cooling medium (i.e. tempering medium), wherein all constructions can be employed that are known to be possible and conceivable for cooling rollers of metal rolling mills, milling rollers etc. The use of evaporating and volatile cooling agents is also conceivable. Furthermore, it may be seen from FIG. 3 that a rotary joint 29 or 29a may be provided on either end of shaft 4, either to supply cooling medium on one side and to discharge it on the other side, as will be the case in the embodiment shown, or when using a hollow shaft having a central hollow space for transporting the fluid in one direction and forming a concentric annular space by means of a tube inserted into the hollow space where the fluid is transported in the other direction. When using this latter construction, the hollow shaft may have a partition wall in the middle of its length so that streams of tempering medium can be supplied from and discharged on both sides, each way extending over half the hollow shaft 4, as is known from agitator and roller mills.

However, application of such a tempering method for chocolate and similar masses is not quite unproblematic, and this is obviously the reason why it has been avoided in the prior art. For, while tempering according to the prior art using the radial outer tempering space 3 results, certainly, in partial solidification of the chocolate mass along the wall 2 where this solidified mass is leveled or scrapped by the tools 9, such tools, that would cooperate with the rotor 6, for example, are normally not provided. FIG. 2 illustrates how scrapping or shearing tools can be arranged according to the invention.

In this embodiment, scraper or shearing tools 9', 9" directed against different directions of rotation of the rotor body 6 are provided on carrier rods 40, 41 (or shields extending in the rotational direction of the rotor body 6) which protrude from the inner wall 2. In this way, scrapping off solidified chocolate can be effected even with inverted direction of rotation of the rotor body 6. In the case of carrier rod 41, this may have assigned still another function by incorporating a temperature sensor 42 into its half directly connected to the wall 2. However, such carrier rods involve that interspaces 43 for allowing passage of the carrier rods 40–42 have to be formed between the ledges of the outer tools 9. There is another embodiment of a scraper or shearing tool 109 in FIG. 2. In this embodiment, a pivotal tool 109 has two scrapping edges in opposite directions on a carrier rod 40. These scrapping edges will automatically orient themselves on the outer surface of the rotor body 6 and are, moreover, suited for the two opposite rotational directions of the rotor body 6.

In order to provide a further tempering facility, the tempering space 3 communicates with a further tempering space 3a in the front wall through an opening 44. Optionally, the additional tempering space 3a may have a separated supply of tempering fluid, e.g. if different temperatures are desired. Here also, the problem can arise that a solidifying layer of chocolate mass would impair the heat transfer from the tempering space 3a to the interior of the vessel 1. Therefore, a double-edged further shearing tool 209 about trapezoidal in cross-section is provided on the shaft 4 and has its two edges engaging the front wall 45. In this way, not only any solidified layer that may have formed on the wall 45 is scrapped off, but this tool 209 provides an additional rheological shearing effect between individual layers of the mass, thus creating an "ointmentation" effect.

Figure 4:
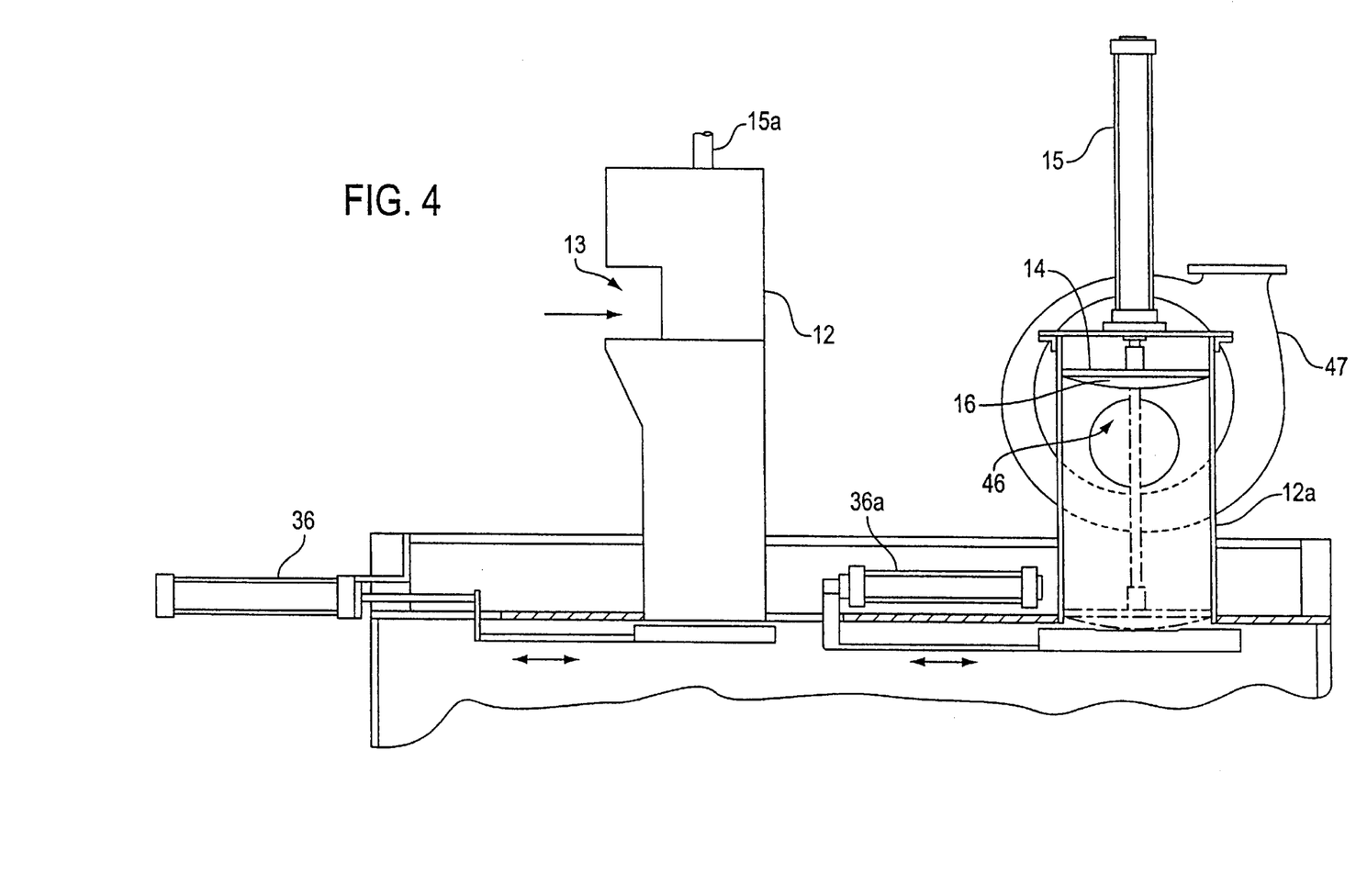
FIG. 4 is an enlarged detail of FIG. 3.

Of course, the supply of an additional material in the form of tempering air into the interior of the conching vessel 1 means an increase of introduced volume which has appropriately to be balanced. This may be done through the shaft 12a, the structure of which being best seen in FIGS. 2 and 4. It should be mentioned, however, that the shaft 12a can also be used to fill the mass into the vessel, if it is, analogously to the construction of the shaft 12, provided with a lateral filling opening 13. In the present embodiment, however, the shaft 12a communicates with a suction channel 46 and a suction fan 47 connected thereto. The shaft 12a may be, for example, rectangular in cross-section or, as in the present embodiment, is cylindrical, guiding a shutter piston 14 when moving down into the position shown in dash-dotted lines by means of a spindle drive or a fluid cylinder 15. This has two advantages. On the one hand, the lower surface 16 of the piston 14 can be oriented towards the axis of the vessel 1 in such a manner as to flush with the inner wall 2 of the vessel 1 when the piston is in its lowered position. In this way, the shearing or scrapping tools 9 will clean this lower surface, whereas the piston 14 itself cleans the interior of the shaft 12 from splashed chocolate mass when moving up or down. The same cleaning device may be provided in the shaft 12 as is indicated by a piston drive cylinder 15a. If desired, the shafts 12, 12a may be closed either fully or only partially (e.g. for limiting the air flow in the shaft) by means of shutter sliders actuated by cylinders 36, 36a shown in FIG. 4.

When the chocolate mass has been treated, it is discharged through a discharge device not shown in the lower part of the vessel 1 which is, for example, formed analogously to the shaft 12 and its piston 14, the shearing and scrapping tools 9 preventing the chocolate mass from adhering to the inner wall 2 and its discharge device. Alternatively, a discharge tube for finished chocolate mass, analogous to the pipe connection 35, may be provided.

Returning now to the structure of the tools 9, FIG. 2 shows clearly that the rotor body 6 can have dissimilar tools 9 and 9a on its arms 8, 8'. Namely, if the scrapping edges of the tools 9, 9a, which extend obliquely to a tangent to the inner wall 2 (cf. FIG. 12), are oriented alternately in forward direction, in relation to a clock-wise rotation, as in the case of the tools 9, and backwards, as in the case of the tools 9a, it will be ensured in either rotational direction of the rotor body 6 that any solidified layer formed on the wall 2 is scrapped off so that the cooling (or heating) effect of the tempering arrangement is fully maintained. If only a single direction of rotation is foreseen, the tools 9a acting in the sense of a rheological shearing effect, i.e. of a mutual displacement of individual layers of the mass, may be at a greater distance from the inner wall 2, if desired, than the shearing tools 9. Optionally, the distance of the tools 9a may be adjusted, e.g. by a spindle, in an analogous way, as will be described later with reference to FIGS. 12 and 13 for adjusting the angle of the respective tool 9a relative to the tangent to the inner wall 2. For it is likewise possible to change the tool's configuration relative to the inner wall 2 by adjusting different angular positions relative to the wall 2 of the shearing or scrapping tools 9 or 9a, especially if the have different purposes (rheological shearing and shearing chocolate mass off the wall).

A further particularity of the tool's structure consists in that mixing blades 11, 11' can be arranged in such an immediate vicinity of the shearing and scrapping tools 9a and 9 that the chocolate mass can be fed from one of the tools to the other one. This will be described later with reference to FIG. 5, but it should be noted that, in the case of the carrier rod 8', two tools, namely 11 and 11', are arranged thereon (cf. FIG. 3), the tool 11 being sickle-shaped forming three angles within the space, as has been suggested in DE-A-195 39 983, but preferably according to U.S. Pat. No. 5,810.476, the contents of these documents being incorporated here by reference. By the close spatial relationship of the two tools of different purposes, the mass released by the shearing or scrapping tools 9 or 0a is immediately seized by the mixing tool 11 or 11'. In this way, an axial and/or radial motion component (the radial motion component is in the case of the sickle-shaped and twisted tool 11', e.g. as in FIG. 15,) is imparted to the chocolate mass for achieving an improved mixing effect. Mixing can be improved further by sub-dividing the shearing or scrapping tools 9 or 9a into individual sections over the length of the cylindrical trough of vessel 1 rather than being ledge-shaped and extending over its entire length. In order to achieve the mixing effect in axial direction, at least part of these sections have lateral surfaces arranged transversely to the axis of the trough, when seen in circumferential direction quite similar as it is the case with the mixing tools 11, 11'. However, it is beneficial with such a sub-divided construction of the tools 9 and 9a if the individual sections of the shearing or scrapping tools 9, 9a are displaced in the direction of the vessel's longitudinal axis so as to fill gaps when seen over the periphery. In this manner, uniform treatment of the chocolate mass is ensured over the entire length of the vessel 1, thus avoiding dead regions where untreated portions of the mass can accumulate.

Figure 5:
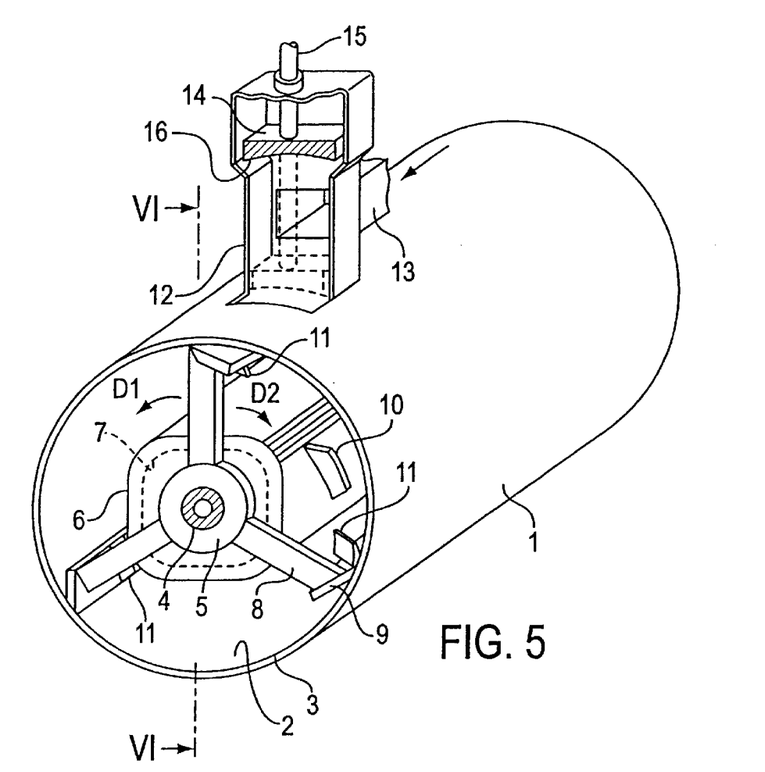

According to FIG. 5, the cylindrical vessel 1 is shown in a schematical representation together with its inner jacket wall 2 to form a tempering space 3. Coaxially to the cylindrical vessel 1, two shafts are supported in a manner not shown in detail, these shafts being formed as hollow shafts 4 and 5. The cavity of the inner shaft 4 serves to supply tempering fluid through the joint 29 (vide FIG. 1) into the rotor body 6 formed as a kneading rotor. As is shown in broken lines in FIG. 5, this rotor 6 has a jacket 7 for tempering its surface.

The hollow shaft 5, however, is supported by the shaft 4. As may be seen from arrows D1, D2 of FIG. 5 indicating the rotational direction, one of the shafts rotates in one direction, e.g. clockwise, while the other one rotates in opposite direction, e.g. counter-clockwise. In this way, a shearing effect is achieved in the chocolate mass in the vessel 1 between the outer surface of the rotor 6 (which kneads due to its outer surface deviating from a cylindrical shape) and the shearing or scrapping tools 9 fixed to the hollow shaft 5 by arms 8. While the cross-sectional shape of the kneading rotor 6 is relative simple, it would be conceivable, in principle, to use a helically twisted shape, as is common for kneading rubber in internal mixers.

When the shearing or scrapping tools 9 rotate in the direction D1, chocolate is scrapped off the inner wall 2 of the vessel 1. Simultaneously, the rotor body 6 rotates in opposite direction to exert a counter-force so that the chocolate mass is not merely dragged as a lump by the tools 9. When the rotational direction of the rotors 6 and 8, 9 is inverted, e.g. so as to rotate in the direction of arrow D2. In this situation, a narrowing gap is formed between the surface of the tools facing the vessel's wall 2 and the inner wall 2 itself. This effects an "ointmentation" or rheological shearing, i.e. shearing between individual layers of the chocolate mass. This shearing effect is necessary for refining chocolate.

It should be mentioned that, while the inner rotor 6 is preferably formed as a kneading rotor, its main function resides, in the first place, in generating a counter-force against the chocolate mass moved by the tools 9. However, if the inner rotor 6 is formed as a kneading rotor, it may have a cross-sectional shape of a rounded square according to the embodiment of FIG. 5. Of course, other shapes are likewise possible. It would even be conceivable to form the inner rotor 6 as a cylinder, but to provide it with appropriate kneading tools. Kneading tools 10 may be seen from FIGS. 5 and 6 which, however serve still another purpose in the embodiment shown. Namely, they are arranged inclined with respect to the longitudinal axis of the vessel 1 and the rotor in the manner of a helix, thus conveying chocolate in the direction of arrow F1 of FIG. 6 when the inner rotor 6 rotates in one sense. In this way, the mass is mixed in longitudinal or axial direction of the vessel 1. At the same time, the tools 9 may comprise appropriate conveying blades 11 at their lower or radial inner side, the blades being distributed over the radial inner sides of the tools 9 in axial direction. In the embodiment of FIG. 5, these blades 11 are relative short, but a configuration is preferred as may be seen from FIG. 6 where blades 11a extend over the whole periphery of the rotor 8, 9. These blades 11 and 11a convey the chocolate mass in the direction of arrow F2 shown in FIG. 2, i.e. opposite the conveying direction of the tools 10 supported by the inner rotor 6.

Figure 6:
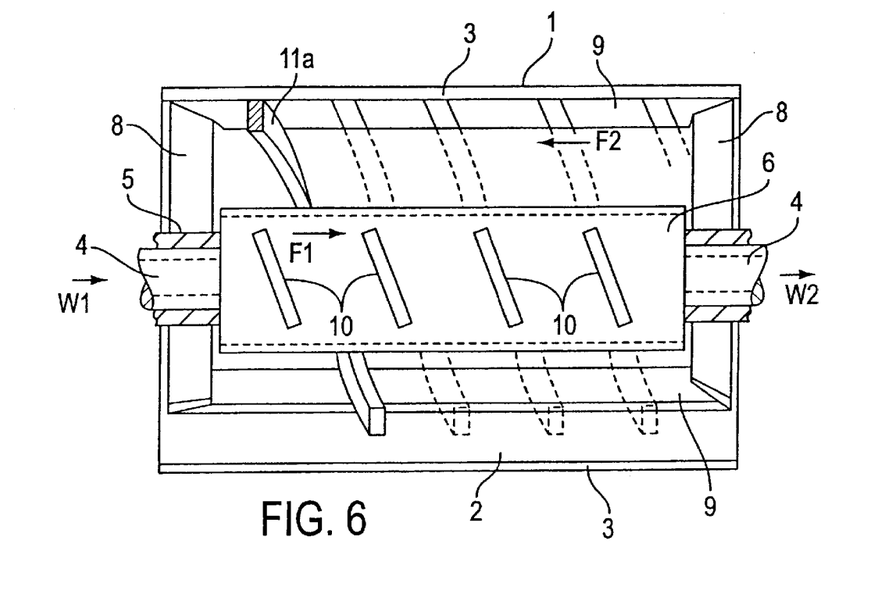
FIG. 6 shows a variant in a cross-sectional view corresponding to the line VI—VI of FIG. 5.

While in FIG. 6 only one thread of a blade 11a is shown, further threads are merely schematically indicated. By the blades surrounding the periphery 8, 9, two effects are attained, i.e. an improvement of the conveying action in the direction of arrow F2 (mixing effect), on the one hand, whereas, on the other hand, the tools 9 and the whole rotor 8, 9 is stiffened along the periphery. For if the rotor 8, 9 is driven on the left side with respect to FIG. 2, the tools 9 will be subjected to twisting strain. This could also be resisted by driving the rotor 8, 9 from the right side too which, however, involves additional expenses. In principle, two separate drives would be necessary for the shafts 4, 5, especially since the rotors 6 and 8, 9 will ordinarily have different revolutions per time unit. In general, the construction will be such that the outer rotor 8, 9 rotates slower than the inner rotor 6. However, it is not inevitable to provide two motors for the two drives, rather a single motor could drive both shafts 4, 5 via an appropriate gear. It is even imaginable that the two shafts 4, 5 are interconnected via a differential gear.

In operation of the embodiment shown in FIGS. 5 and 6, the vessel 1 is first charged through the filling shaft 12. The filling shaft 12 is, for example, rectangular in cross-section and is connected to the supply tube 13 of like cross-section or of a cylindrical cross-section. The mass to be treated and refined is charged through the supply tube 13 after which the shutter piston 14 is lowered by a spindle drive 15 into the positions shown in broken lines. This has two advantages. On the one hand, the lower surface 16 of the piston 14 can be oriented to the axis of the vessel 1 in such a manner that it flushes with the inner wall 2 of the vessel 1 in the lowered position of the piston 14. Thereby, the shearing tools 9 effect cleaning of this surface, while, on the other hand, the piston 14 itself cleans the interior of the shaft 12 when moving up or down. Nevertheless, it should be mentioned that an air supply could be provided on the piston 14, as it is possible to provide air supply nozzles on the walls of the vessel 1, this air enabling not only aerating of the chocolate mass, but also tempering thereof. Such a tempering measure is more efficient than via the wall 2 of the vessel 1 in that the tempering fluid passes through the mass itself and, thus contacts the mass more intensely. After treatment of the chocolate mass, it is discharged by means of a discharge device not shown in the lower part of the vessel 1 which is, for example, formed analogously to the shaft 12 and its piston 14, the shearing and scrapping tools 9 preventing the chocolate mass from adhering to the inner wall 2 and its discharge device.

Thus, it is clear that due to double tempering, i.e. by the tempering space 3 of the vessel 1, on the one hand, and by the tempered inner rotor 6, for example, on the other hand, (the tools of which could also be hollow and having a tempering fluid flowing therein) such an intense cooling (or heat input) is effected that great amounts of heat energy can be dissipated which, in turn, enables an intensive treatment by the mechanical energy introduced via the shafts 4 and 5.

Supply of cooling or tempering medium to the shaft 4 can be effected according to arrow W1 (left side of FIG. 2), and discharge is made in the direction of arrow W2 (right side of FIG. 2) at the other side of the inner rotor 5. It is, however, also conceivable to provide the supply and the discharge of tempering medium, e.g. for cold or hot water, at the same side, as is known e.g. from agitator mills. Likewise, it would be possible to use an evaporating cooling medium, as has also been suggested for agitator mills.

Figures 7, 8, 11:
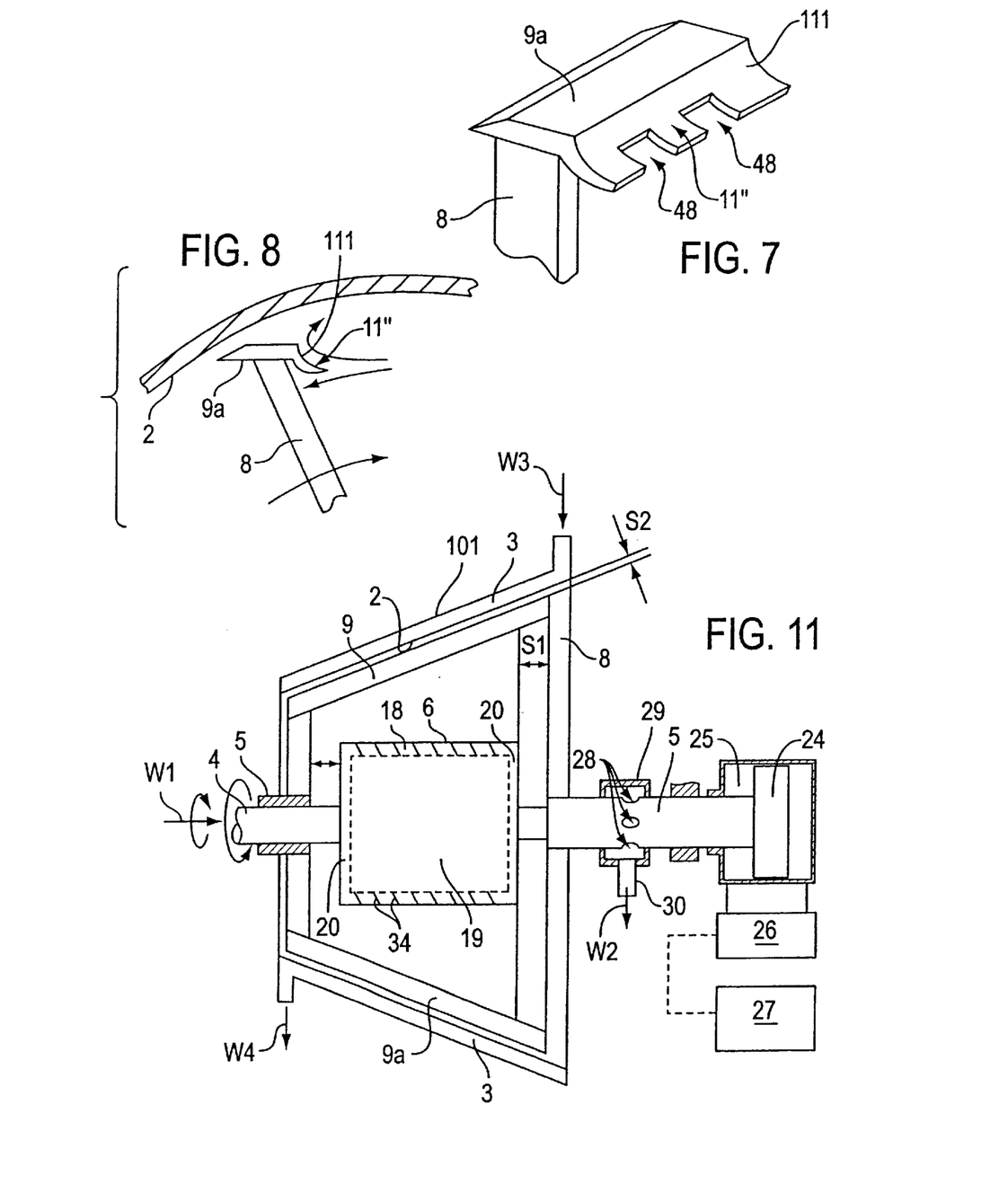
FIGS. 7 and 8 illustrate a perspective view and a side elevation of an alternative to the tool arrangement shown in FIGS. 5 and 6.
FIG. 11 illustrates a further embodiment in a cross-sectional view corresponding to that of FIGS. 6 and 9.

An alternative to the tools 9 and 11 of FIGS. 5 and 6 is shown in FIGS. 7 and 8. The advantages of a close vicinity of shearing or scrapping tools 9, 9*a* and mixing tools 11 or 11' have already been pointed out above with reference to FIG. 2. In FIGS. 7 and 8, a comb-like tool 11" is arranged before a shearing tool 9 that suitably has a bent front surface 111. As best seen from FIG. 8 and its arrows showing the flow of chocolate mass, the same is deviated towards the inner wall of the conching trough when the arm 8 rotates in clockwise direction, thus enhancing the shearing action. By providing comb-like recesses 48 (FIG. 7) in the surface 111, part of the mass passes these recesses (lower arrow in FIG. 8) thereby improving the mixing effect. In this sense, a mutual supplement or synergetic action of the function of the two types of tools 9*a* and 11" is achieved. Such a synergetic effect can, however, also be in reverse in that the scrapping tool 9 (see FIG. 2) scraps chocolate mass off the inner wall 2 directing it towards the mixing tool 11, 11' or 11" which then distributes the mass supplied in axial direction of the vessel 1 and of the rotor 6, thus providing and enhancing the mixing effect.

The energy to be introduced can be further increased by additional measures, as will be explained in the following with reference to FIGS. 9 and 10. It can be seen that the vessel 1 is substantially the same as in FIGS. 5 and 6. Likewise, the tools 9 fixed to the arms 8 and the hollow shaft 5 correspond to the previous embodiment. In addition, however, relative short shearing or scrapping tools 9*a* are located on the hollow shaft 5, preferably cooperating with stator tools 17 extending inwards in radial direction. FIG. 10 illustrates, by way of example, a possible distribution of such stator tools 17 in the lower region of the vessel 1. A very strong shearing effect will result between the tools 9*a* and 17.

However, FIG. 10 illustrates also that in this embodiment the cross-section of the inner rotor 106 is constructed as a rounded triangle. Within this triangle, an inner peripheral tempering channel 18 is formed between an outer wall and a cylindrical core 19. The tempering channel 18 follows the contour of the core 19, but it is more preferred if it is also triangular in cross-section in correspondence with the outer contour of the rotor 106. Tempering medium (in general water) is supplied to the peripheral channel 18 through the hollow shaft 4 and radial channels 20 in a similar way as is known from roller mills. With such an arrangement for cooling or tempering, it will be suitable to provide the outer surface of the core 19 with helical guiding walls (see 34 in FIG. 11) in order to obtain a forced flow of tempering medium around the periphery of the inner rotor 106 and the core 19. Alternatively, tempering channels may be provided that extend parallel to the generatrices of the inner rotor 6 or 106, a plurality of such tempering channels being distributed over the circumference of the rotor, as has also been suggested for cooled milling rollers.

Figure 9:
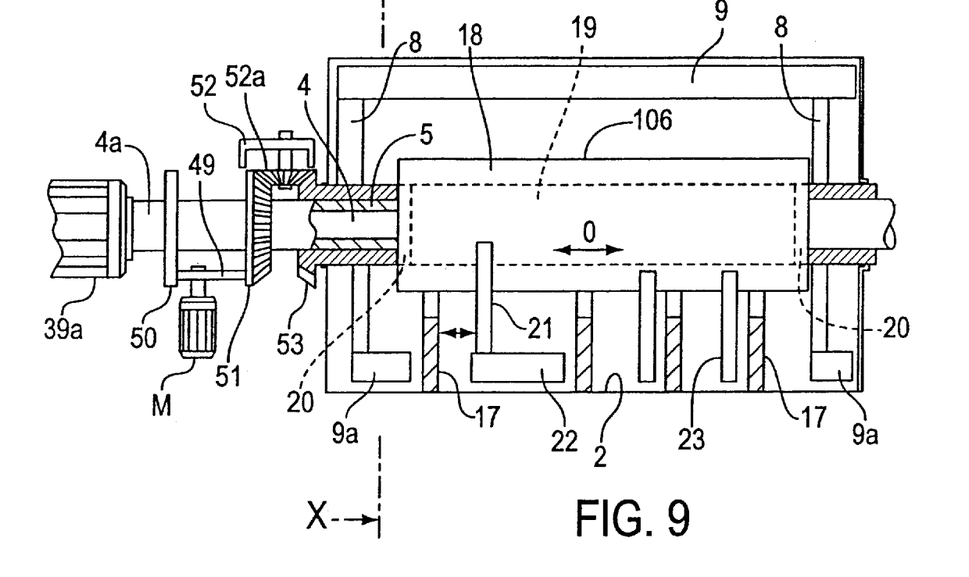
Figure 10:
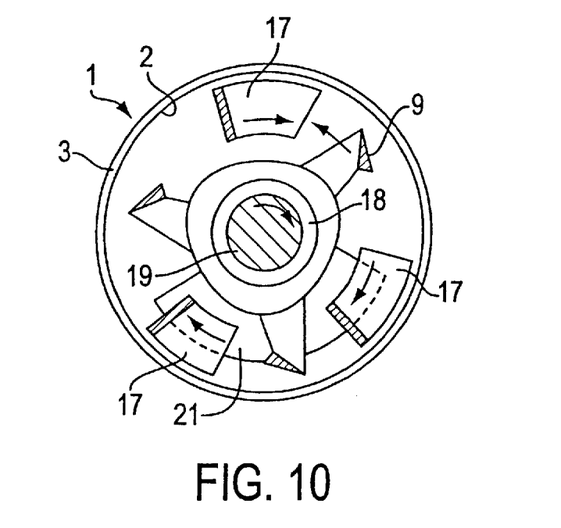
FIG. 10 is a cross-section along the line X—X of FIG. 9.

Outside the inner rotor 106, two different types of tools are provided according to FIG. 9, the tools being either provided together on an individual rotor, as shown, or only one of them is arranged on it.

One of these two types of tools are sector-shaped plates 21 (see FIG. 10) provided with angled protrusions 22. The radially projecting plates 21 cooperate with the stator tools 17 to obtain a shearing effect, whereas the protrusions 22 cooperate with the inner wall 2 of the vessel 1 to the same effect, i.e. for the purpose of "ointmentation". Accordingly, the protrusions 22 can be formed in a similar way as the tools 9, i.e. converging with respect to the inner wall 2 of the vessel 1.

Instead of the tools 21, 22 (or in addition to them), radial extending blades 23 may also cooperate with the stator tools 17, as is known per se in liquefying machines. The blades 23 can, if desired, be turned to exert a conveying effect as described above with respect to the tools 10 of FIG. 9. Another measure for increasing shearing energy may consist in that at least the inner rotor 106, optionally also the rotor 8, 9, is driven by an oscillating drive of known construction to carry out a motion to and fro in the sense of arrow O (FIG. 9). This may, for example, be done in that a cam or an eccentric 49 is arranged between two Flanges 50, 51 on a drive shaft 4*a*, e.g. of a motor 39*a*, which, if desired, may either be connected to the shaft 4 or even is a prolongation of it. In this way the shaft 4 is displaced to and fro by a displacement motor M which provides for the motion in the sense of arrow O during the rotation of shaft 4. Such drives are known per se in technology, for example, for driving thread guides of quick traverse (cross coil) winders in textile industry or in metal rolling mills. It is possible within the scope of the present invention either to displace a single rotor 6 with respect to the vessel 1 in axial direction, or to provide two rotors displaceable relative to each other.

When moving in the sense of arrow O, a gear box 52, which is merely schematically indicated and comprises a bevel gear as an intermediate gear, will also be displaced. This bevel gear transfers the rotation of the flange 51 provided with bevel gear teeth to another bevel gear 53 connected to the shaft 5.

It should be mentioned here that instead of a periodic axial displacement via the cam 49, a mere adjustment in axial direction, e.g. by a handwheel instead of using a motor M, for adjusting the distance of the tools 17, 22 and 23 may also be beneficial.

Moreover, it should be understood that the gear connection shown is only one possible example, and various modifications can be thought. For example, the motor 39*a* may correspond to the motor 39 of FIGS. 2 and 3 and could be connected to the shaft 4 in the same way via an appropriate gearing. Furthermore, the motor M is not inevitably necessary if, instead, a gear connection is provided between the cam 49 and the shaft 4 or 4*a*. Finally, it would also be conceivable to form the gear box 52 as a part of a differential drive and to rotate it about the axes of the shafts 4 and 5, optionally braking it for control purposes.

Since the cooperation of the tools 9, 9*a* with the inner wall 2 of the vessel 1 is based on a relative motion, it would also be possible to rotate the vessel 1 and to have the inner part 6 or 106 stationary (or also moving, e.g. in opposite direction). It is not necessary within the scope of the invention to provide a cylindrical vessel in a narrower sense. FIG. 11 shows a conical vessel (a cylinder in a broader sense) in which a correspondingly formed rotor 8, 9 is driven for rotation by the hollow shaft 5. All the other parts have already been explained with reference to the previous embodiments.

In this embodiment, a gap s1 is formed between the arms 8 and the inner rotor. A plurality of arms 8 may be arranged around the hollow shaft 5 and are fixed thereon to provide another shearing effect within the gap s1. This shearing effect can be changed in the same way as in a gap s2 between the tools 9 and the inner wall 2 of the vessel 101. To this end, the shaft 5 of the rotor 8, 9 is prolonged to the right side (with reference to FIG. 11) and is connected to a plunger 24 within a cylinder 25. In FIG. 11, this connection is a direct connection so that the plunger 24 would rotate with the shaft 5, but this direct connection may be interrupted by a clutch or the like (not shown) so that a relative rotatable connection between the shaft 5 and the plunger 24 is created while in axial direction the connection is rigid. A control device 26 is assigned to the cylinder 25 for controlling the inlet of a fluid to one or the other side of the plunger 24 so that the dimensions of gaps s2 and s1 can be changed, the fluidic control device 26, in turn, receiving command signals from an electronic control 27. The control devices 26, 27 can be part of a mere adjustment device (which is preferred) or can be operated to perform a periodic axial movement of the shaft 5.

In the case of such an axial displacement, it is advantageous if the outer hollow shaft 5 communicates with the inner space of the hollow shaft 4 through openings 28 so that tempering medium flowing in the direction of arrow W1 can exit through the openings 28 and can enter the rotary joint 29 from which the tempering medium is discharged in the direction of arrow W2 through a discharge pipe 30. In analogous manner, the tempering space 3 is supplied through an inlet W3 for the tempering medium as well as an outlet at W4.

Quite a lot of treatment energy introduced into the chocolate mass is furnished by the shearing and scrapping tools 9, 9a, mainly by a rheological shearing. The degree of shearing and the amount of chocolate mass taken into the shearing gap of the tools 9, 9a (according to the rotational direction), which becomes more and more narrow, depends not least on the angle assumed by the surface of the tool 9 or 9a, which faces the inner wall 2, in relation to a tangent on the opposite inner wall 2. Such a tangent may always be drawn to the walls of conching vessels, since its trough (or trough compartment, if two or more trough compartments are parallel to each other instead of a whole cylinder of vessel 1, as is quite typical with conching machines) forms always a circle in cross-section, at least in part. It has been pointed out above that more mass is drawn into the gap in a combination with the surface 111 (FIGS. 7, 8), thus intensifying the shearing effect.

Figure 12:
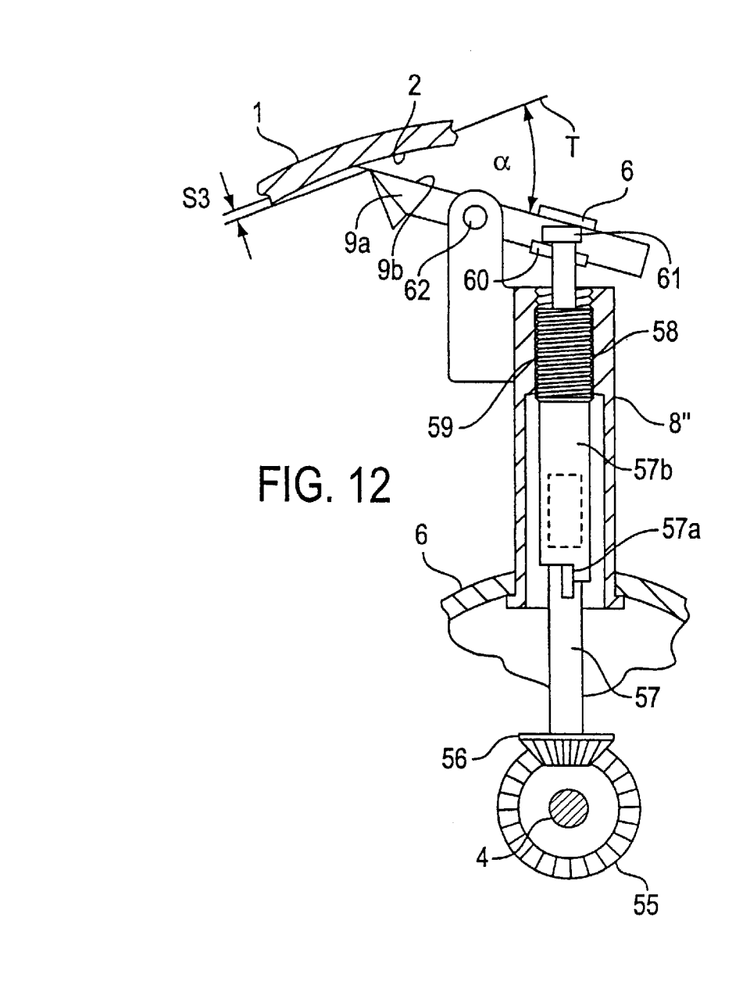
FIGS. 12 and 13 depict partial cross-sectional views, perpendicular to each other, of an adjustment device for a shearing or scrapping tool.
Figure 13:
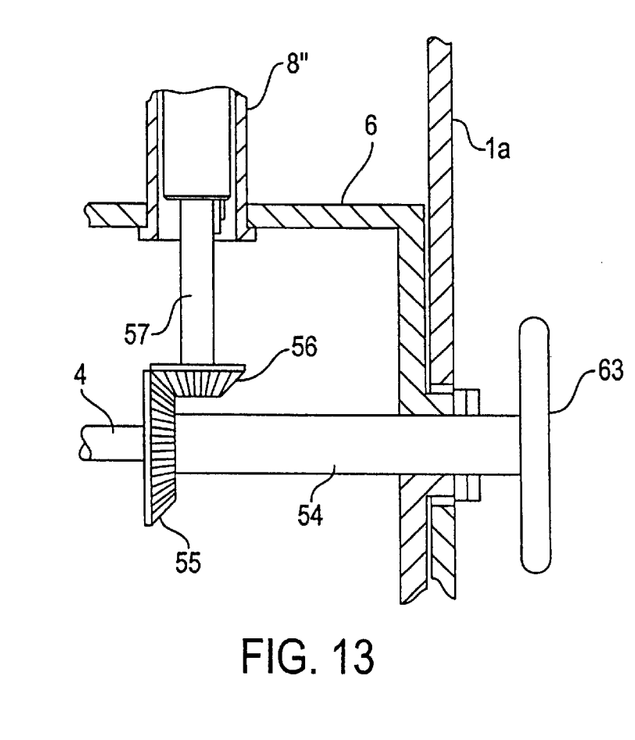

Therefore, instead of a rigid surface 111, the configuration relative to the inner wall 2 can be changed by adjusting either the angle of incidence of the shearing tools 9 or 9a and/or its distance to the inner wall 2 as will be explained below with reference to FIGS. 12 and 13. According to FIGS. 12 and 13, the conching shaft 4 is supported within an adjustment shaft 54, and this, in turn, is supported in a front wall 1a of the conching vessel 1. The adjustment shaft 54 is, for example, connected to a bevel gear 55 engaging another bevel gear 56. This further bevel gear is fixed to a shaft 57 extending in radial direction relative to the longitudinal axis of the shaft 4. The shaft 57 is supported within a tool arm 8".

Connected for common rotation with the radial shaft 57, for example by means of a projection 57a, is another shaft 57b that is displaceable in axial direction relative to the shaft 57 and has a thread 58 at its outermost end region screwed into a sleeve 59 fastened within the arm 8" and comprising an inner thread which engages the outer thread 58 of the shaft 57. At the end of the shaft 57b is a coupling element, e.g. in form of a disk 61 inserted between two projections 60, to form a movable connection with the tool 9a.

Now, since the shearing tool 9a is supported pivotally about a pivot axis 62 rigidly connected to the carrier 8", as is illustrated, rotating a handwheel 63 outside the conching vessel 1 provokes rotating of the bevel gears 55, 56 and of the shafts 57, 57b, and consequently provokes an axial displacement of the shaft 57b by the threaded parts 58, 59. Since the connection comprising the parts 60, 61 is articulated, the tool 9a can then pivot about the pivot axis 62, thus altering the angle alpha assumed by the surface 9b of the tool 9a, which faces the inner wall 2, relative to a tangent onto this inner wall 2 at that location.

In an analogous manner, the distance s3 to the inner wall 2 can be altered, if the configuration relative to the latter is intended to be modified by altering the distance instead of the angle. In this case, a connection between shafts 57b and 57 is provided that is rigid in axial direction, but allowing rotation of the shaft 57b instead of the connection 60, 61 and the pivoting axis 62. In this way, the tool is displaced in radial direction towards and away from the inner wall 2 of the trough 1 when the two shafts 57, 57b are prolonged or shortened due to the screw connection 58, 59. It should be understood that, optionally, both measures, i.e. pivoting and changing the distance, could be employed both, the gearing mechanism shown being, of course, only one of a variety of possibilities.

Turning again to FIG. 2, scraper or shearing tools 9', 9" or 109 are carried by carrier rods 40, 41. These rods 40, 41 can be subjected to a considerable moment of flexure depending on the diameter of the vessel 1. On the other hand, one has to consider that chocolate reaches the shaft portion of the rotor 6 mainly due to the fact that the rotor tools 9, 9a entrain a veil of chocolate mass when moving in upward direction, thus exposing it to oxygen. When this veil has reached a certain height, it may easily drop down from above onto the shaft portion of the rotor 6 where it remains and sticks and is out of treatment, the shaft being cooled or not.

Figure 14:
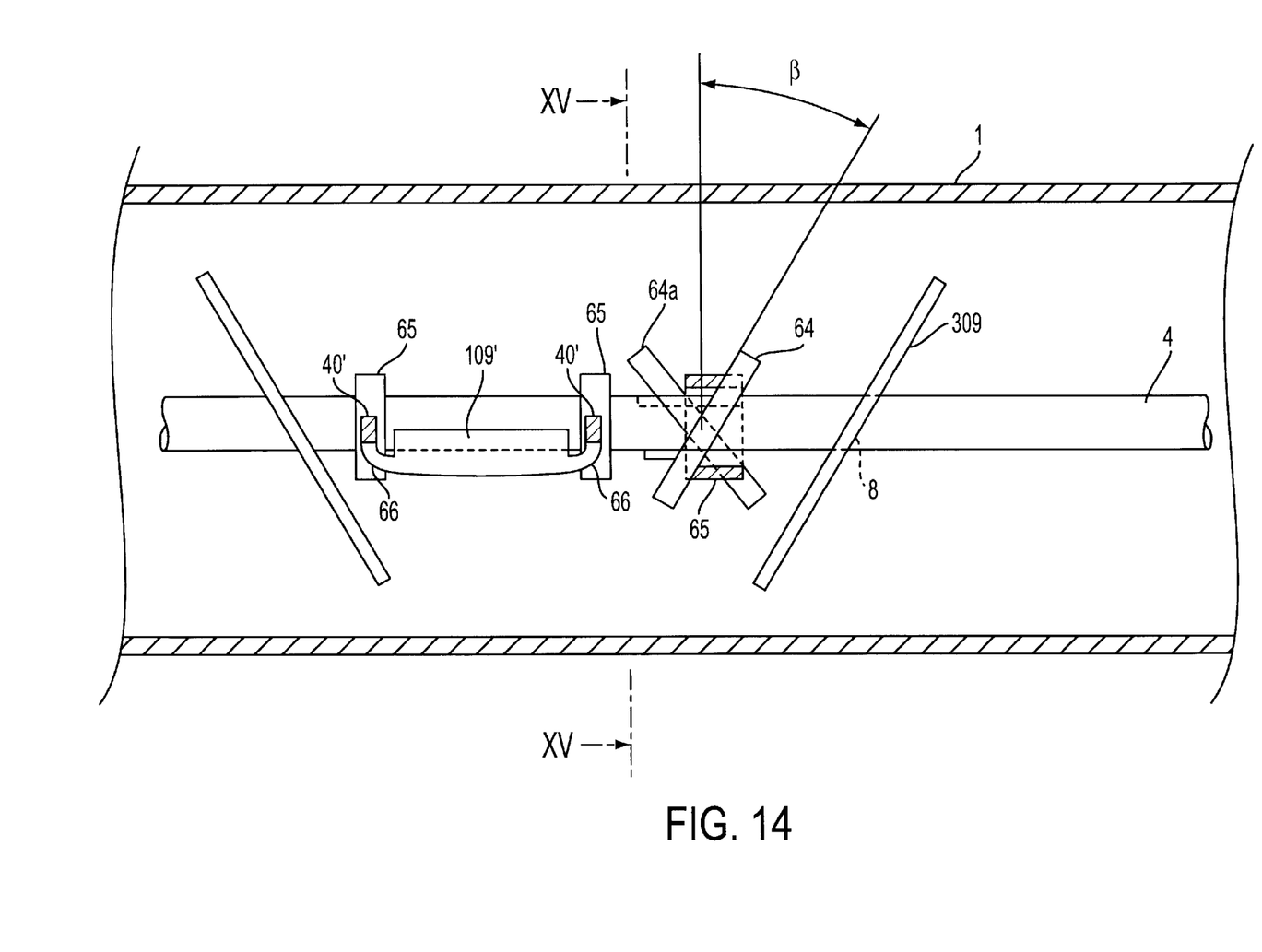
FIG. 14 is a lateral view, partially in cross-section, of an alternative embodiment of the invention.
Figure 15:
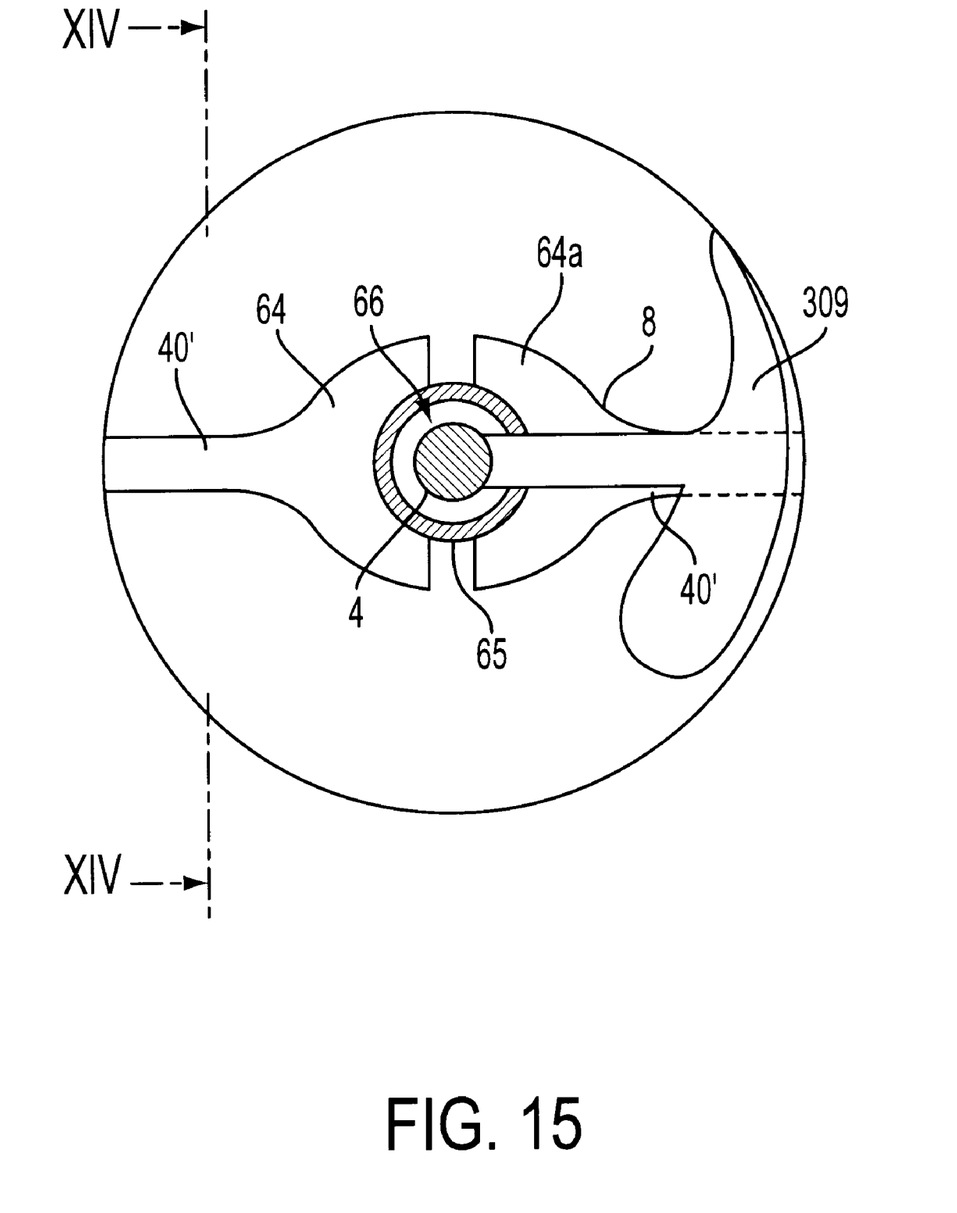
FIG. 15 is a cross-section along the line XV—XV of FIG. 14.

This can be prevented according to FIGS. 14 and 15 by providing deflecting blades 64, 64a which surround the shaft 4 at least in part and deflect chocolate mass which drops down away from the shaft 4 and downwards into the vessel 1. As seen from FIG. 15, the blades 64, 64a are formed in such a way that a sickle-shaped rotor tool 309 can pass over them. The deflecting blade 64a (FIG. 14) can be arranged a relatively small distance from the arm 8 of the adjacent sickle-shaped rotor tool 309 so that only a minimum amount of chocolate mass is allowed to drop onto the shaft 4. To allow deflection of the chocolate mass downwards, the blades 64, 64a extend substantially in a vertical direction. Suitably, however, the blades 64, 64a are tilted about an axis passing orthogonally through an axis of the shaft 4 (i.e., an axis extending normally out of the page in FIG. 14), the tilting being by an angle β with respect to a vertical plane that encompasses the tilt axis and is normal to the axis of shaft 4, as shown in FIG. 14. This ensures that the blade can cover a considerable length of the shaft 4. To enlarge this length, the blades 64, 64a can be lengthened in an axial direction, optionally twisting them to an S-shape, or several short blades can be provided, e.g. each on a separate ring 65, between two adjacent rotor tools 309. Alternatively, a single blade can extend over both sides of the shaft 4. Thus, the blades 64, 64a act as an alternative device for preventing chocolate from adhering to the shaft 4.

To avoid large moments of flexure, one end of the blades 64, 64a can be anchored on one of two opposite sides of the vessel's wall by connecting arms 40', e.g. of triangular cross-section, welded or mounted to this wall. The inner ends of the blades 64, 64a are attached, e.g. welded, to an inner body formed as a ring 65 which surrounds the shaft 4 and which can be supported by the inner blades which in turn, are connected to the vessel's walls. The ring 65 leaves, preferably, a gap 66 between its inner wall and the outer surface of the shaft 4 in order to allow some slingering movement of the shaft 4 due to the forces acting on it during operation. Of course, the ring 65 can be replaced by any other body, such as a frame, which interconnects the pair of blades 64, 64a while gripping over the shaft 4.

This type of a two-sided support for a stator tool can also be used to support a scraper tool 109'. According to the embodiment shown in FIG. 14, two rings 65 spaced from each other are connected to the vessel's wall via arms 40' similar to the arms 40' which hold the blades 64, 64a in FIG. 15. Between the arms 40' extend holders 66 of a knife-like scraper tool 109' and are connected to the arms 40' in any manner known in the art, such as by welding or in a removable way. Of course, the blades 64, 64a could also be supported by two spaced rings, especially if they extend over a wider axial space or any other type of support.

It will be clear that within the scope of the present invention individual characteristics of an embodiment can be combined with those of another embodiment as well as with features of the prior art. Furthermore it will be understood that, certainly, part of the embodiments of details shown and new with respect to the prior art will contribute to a better relationship of energy supplied and dissipated (by cooling), which is the object of the present invention, but that they are inventions by their own, as it is the case, for example, with the adjustment facilities for the tool explained with reference to FIGS. 12 and 13, the arrangement of shearing and mixing tools in close vicinity (FIGS. 2–8) or with the axial displacement of the rotor relative to the stator (vessel) according to FIGS. 9–11.

What is claimed is:

1. An apparatus for processing a chocolate mass, comprising:

first wall means forming a conching vessel along a longitudinal axis, said vessel having a top portion, and said first wall means being cylindrical at least in part;

at least one coaxial part extending within said vessel and having an outer surface;

first shearing tool means operatively connected to said coaxial part, said first shearing tool means having a shearing edge shaped with respect to said first wall means;

second tool means for preventing chocolate mass from adhering on said outer surface, said second tool means being supported by said first wall means; and drive means for imparting a relative motion between said vessel and said coaxial part so that said first wall means are swept by said first shearing tool means.

2. Apparatus as claimed in claim 1, wherein said second tool means comprise:

deflection blade means extending over said coaxial part to deflect chocolate mass which drops toward said outer surface.

3. Apparatus as claimed in claim 2, wherein said blade means are arranged at an angle relative to a vertical plane normal to an axis of said coaxial part.

4. Apparatus as claimed in claim 1, further comprising:

an inner body placed over said coaxial part, at least one end of said second tool means being mounted on said body.

5. Apparatus as claimed in claim 1, wherein said second tool means comprise:

a pair of deflection blades, one outer end of each deflection blade being mounted on said first wall means, and an inner body placed over said coaxial part fixing inner ends of said deflection blades.

6. Apparatus as claimed in claim 4, wherein said inner body is ring-shaped.

7. Apparatus as claimed in claim 4, wherein said inner body is placed so as to leave a gap between said inner body and said coaxial part.

8. Apparatus as claimed in claim 1, wherein said second tool means comprise:

scraper tool means having a shearing edge which engages said outer surface.

9. Apparatus as claimed in claim 5, wherein said second tool means comprise:

scraper tool means having a shearing edge which engages said outer surface.

* * * * *